US011613108B2

(12) United States Patent
Fortin et al.

(10) Patent No.: US 11,613,108 B2
(45) Date of Patent: Mar. 28, 2023

(54) PACKAGING MATERIAL

(71) Applicant: GPCP IP HOLDINGS LLC, Atlanta, GA (US)

(72) Inventors: Lori Jeanne Fortin, Peachtree Corners, GA (US); Ana Michel Retzlaff, Appleton, WI (US); Andrew Paul Balliet, Appleton, WI (US); Gary Harold Knauf, Bear Creek, WI (US)

(73) Assignee: GPCP IP Holdings LLC, Atlanta, GA (US)

( * ) Notice: Subject to any disclaimer, the term of this patent is extended or adjusted under 35 U.S.C. 154(b) by 319 days.

(21) Appl. No.: 16/933,692

(22) Filed: Jul. 20, 2020

(65) Prior Publication Data

US 2022/0016875 A1 Jan. 20, 2022

(51) Int. Cl.
| | |
|---|---|
| *B32B 27/10* | (2006.01) |
| *B32B 27/30* | (2006.01) |
| *B32B 27/32* | (2006.01) |
| *B32B 27/40* | (2006.01) |
| *D21H 19/12* | (2006.01) |
| *D21H 19/82* | (2006.01) |
| *D21H 21/16* | (2006.01) |
| *D21H 23/76* | (2006.01) |

(52) U.S. Cl.
CPC ............ *B32B 27/10* (2013.01); *B32B 27/304* (2013.01); *B32B 27/306* (2013.01); *B32B 27/308* (2013.01); *B32B 27/32* (2013.01); *B32B 27/40* (2013.01); *D21H 19/12* (2013.01); *D21H 19/82* (2013.01); *D21H 21/16* (2013.01); *D21H 23/76* (2013.01); *B32B 2250/03* (2013.01); *B32B 2250/24* (2013.01); *B32B 2307/31* (2013.01); *B32B 2307/7244* (2013.01); *B32B 2307/7246* (2013.01)

(58) Field of Classification Search
CPC ....... B32B 27/306; B32B 27/32; B32B 27/10; B32B 27/40; B32B 27/304; B32B 2307/7246; B32B 27/308; B32B 2307/31; B32B 2307/7244; B32B 2250/24; B32B 2250/03; D21H 19/82; D21H 23/76; D21H 19/824; D21H 21/16; D21H 19/12; D21H 27/10
USPC ....................................................... 162/137
See application file for complete search history.

(56) References Cited

U.S. PATENT DOCUMENTS

| | | |
|---|---|---|
| 5,776,619 A | 7/1998 | Shanton |
| 6,106,950 A | 8/2000 | Searle et al. |
| 6,902,802 B2 | 6/2005 | Kurian et al. |
| 8,063,119 B2 | 11/2011 | Feeney et al. |
| 8,105,667 B2 | 1/2012 | Knoerzer et al. |
| 8,409,679 B2 | 4/2013 | Bentmar et al. |
| 9,527,615 B2 | 12/2016 | Olsson |
| 2003/0188839 A1 | 10/2003 | Urscheler |
| 2004/0037983 A1 | 2/2004 | Reighard et al. |
| 2005/0084686 A1 | 4/2005 | Imaizumi |
| 2008/0070043 A1 | 3/2008 | Arai et al. |
| 2008/0070047 A1 | 3/2008 | Rehkugler |
| 2011/0132975 A1 | 6/2011 | Toft |
| 2014/0272213 A1 | 9/2014 | Rasanen et al. |
| 2014/0377486 A1 | 12/2014 | Larsson et al. |
| 2015/0344729 A1 | 12/2015 | Breese et al. |
| 2016/0137866 A1 | 5/2016 | Nguyen et al. |
| 2017/0087810 A1 | 3/2017 | Schuman et al. |
| 2019/0118517 A1 | 4/2019 | Bonekamp et al. |
| 2019/0232625 A1 | 8/2019 | Barreneche et al. |
| 2020/0094604 A1 | 3/2020 | Singh |
| 2020/0109517 A1 | 4/2020 | Pang et al. |
| 2020/0149222 A1 | 5/2020 | Pang et al. |

FOREIGN PATENT DOCUMENTS

| | | |
|---|---|---|
| EP | 1582557 B1 | 3/2009 |
| EP | 1658175 B1 | 10/2009 |
| EP | 2777934 B1 | 3/2017 |
| EP | 2199077 B1 | 4/2017 |
| WO | 2005018932 A1 | 3/2005 |
| WO | 2014006269 A1 | 1/2014 |
| WO | 2019199491 A1 | 10/2019 |
| WO | 2019239334 A1 | 12/2019 |

OTHER PUBLICATIONS

Final office action received for U.S. Appl. No. 15/948,568, dated Sep. 15, 2021, 9 pages.
International search report and written opinion received for PCT application No. PCT/IB2021/056519, dated Sep. 20, 2021, 10 pages.
"Joncryl DFC 3030", Printing & Packaging, Functional Packaging Coatings, Technical Data Sheet, BASF, Dec. 2019, 3 pages.
International Search Report and Written Opinion for International Application No. PCT/US2019/024834, dated Jun. 4, 2019, 10 Pages.

*Primary Examiner* — Mark Halpern

(57) ABSTRACT

Packaging material formed from a substrate and three coating layers or in some instances at least three coating layers, each coating including an aqueous polymeric solution or dispersion dried to form a continuous film such that the packaging material is provided with tailored performance attributes including desired moisture vapor transmission rates, oxygen permeation rates, oil and grease resistance peel strength. The materials forming the packaging material may be compostable or biodegradable.

6 Claims, 4 Drawing Sheets

PACKAGING MATERIAL

A packaging material and methods for making the packaging material are described. The packaging material includes a substrate with coatings to provide a packaging material having tailored moisture vapor transmission, oxygen permeation or transmission, oil and grease resistance, and light properties. The packaging material may be a flexible packaging material.

BACKGROUND

Various materials have been used for packaging foods, liquids, and other materials that need protection from handling, moisture, water (liquid and vapor) oxygen, and light.

Conventional barrier layers or films that are intended to reduce or inhibit the permeation of vapor typically include polyolefins, polyesters, polyvinylidene chloride, acrylic polymers, styrene acrylate, styrene butadiene, polyurethanes, polyamides, and metallic foils (aluminum). Polyvinyl alcohol (PVOH) and copolymers such as ethylene vinyl alcohol copolymer (EVOH) are known to have good oxygen barrier properties, but the performance is highly dependent on ambient relative humidity. Indeed, while a thin dispersion coated layer of PVOH or EVOH or a similar polymer may be suitable for packaging of dry products in a dry environment, such a layer is not ideal for liquid packaging unless encapsulated by water-vapor and liquid resistant layers. As such, a barrier layer including polyvinyl alcohol or copolymers thereof typically includes, among other things, additives, cross-linking agents, multivalent cations, and/or platy fillers. However, even with such additives, the oxygen barrier performance when the relative humidity is about 75 percent is generally poor.

In addition, crosslinking the polymer or including additives to improve the moisture resistance makes processing more difficult and more expensive and also may run afoul of existing food safety regulations for food packaging. Moreover, the crosslinking and inclusion of additives may affect pot life and therefore manufacturability.

Water-based polyurethanes can also have good oxygen barrier properties, but lack high gas and moisture vapor barrier under high humidity conditions. As such, a barrier layer including water-based polyurethane typically includes an inorganic filler or requires pre-treatment of the underlying substrate with a metal oxide layer or the use of a metallized film.

For example, U.S. Patent Publication No. 2005/0084686 generally discloses aqueous gas barrier coatings that include dispersed polyurethane resins and layered inorganic materials, but the disclosure is limited to a one-coat system on the surface of the substrate or within a laminate system. U.S. Patent Publication No. 2008/0070043 generally discloses aqueous gas barrier coatings that include a polyurethane, but uses a metal oxide layer applied to the base film, i.e., underneath the coating, to achieve the desired gas water vapor barrier properties.

Metallized substrates have also been independently employed to provide a gas barrier. However, such metallized substrates are typically expensive and, because of their low flexibility, are commonly used as an intermediate layer of a laminated structure.

Indeed, as a result of the shortcomings of the conventional coatings used in packaging materials for food and liquid materials, the packaging material is generally always coated with a laminate, i.e., a bulk core layer of paper or paperboard and an outer laminate layer that includes multiple liquid barrier layers of thermoplastics. And, in order to ensure that the packaging for dry and wet materials has both water vapor barrier properties and oxygen barrier properties, the outer laminate layer generally includes at least one foil layer, e.g., aluminum foil. As long as the aluminum foil is not damaged, the presence in the laminate effectively prevents any molecules existing in the environment around the package or in the packaged product from migrating in any direction through the foil. In fact, there are few known packaging materials that do not include a foil laminate and those known, are typically difficult to process because they require expensive co-extruded layers or are much thicker than foil laminates and, thus, more expensive to produce.

In addition to the use of laminates to provide barrier properties to packaging materials, conventional barrier layers or films for packaging materials may also be commonly applied via melt extrusion coating. However, as generally discussed above, melt extrusion coating complicates processing of the packaging and increases the expense. European Patent Publication No. 2 199 077 generally describes packaging for liquid or wet food that includes a core substrate, a first heat sealable polyolefin layer applied to the outside of the core substrate, an oxygen gas barrier layer formed by liquid film coating and applied to the inner side of the core substrate, a water vapor barrier layer disposed on the oxygen gas barrier layer, and a second heat sealable polyolefin layer applied on to the water vapor barrier layer. The water vapor barrier layer is laminated to the oxygen gas barrier layer via direct extrusion or co-extrusion coating of the polyolefin-based water vapor barrier layer. The second heat sealable polyolefin layer is also directly extruded onto the water vapor barrier layer or co-extrusion coated together with the water vapor barrier layer. As such, even though this reference teaches a non-foil paper or paperboard packaging laminate, the formation of the packaging requires laminates and extrusion coating.

It has been recognized that barrier layers applied by liquid film or aqueous coating may help to reduce complexity in converting operations. In addition, such liquid film coating may reduce overall material usage and eliminate manufacturing steps. However, as discussed above, such liquid film coating applications only exist in single water-based barrier layer coatings in combination with melt extruded or laminated layers.

Moreover, while light shielding is typically accomplished through the paperboard itself, manufacturers currently use an additional metal foil lamination layer to further block light from transmitting through the packaging. It would be advantageous to eliminate the need for the additional lamination step and accomplish the light shielding trait through aqueous coating.

As such, there remains a need in the art for aqueous multi-barrier coatings and methods of application that reduce the need for or completely eliminate additional extrusion or lamination steps but still achieve desired moisture resistance, water vapor barrier, oil and grease resistance, and light shielding properties.

SUMMARY

A packaging material having a substrate and aqueous coating compositions and methods of making the packaging materials are described. In an aspect, the packaging material has a substrate that includes at least two layers, wherein the at least two layers comprise a first layer and a second layer disposed on the first layer, wherein the first and second layers each comprise a composition comprising an aqueous polymeric solution or dispersion, and wherein the composition is dried to form a continuous film to provide distinct barrier functions. In an aspect, the substrate can include treated or untreated paper and/or paperboard.

The first and second layers can be different compositions from one another. In an aspect, the first layer composition, coated onto the substrate, can be used to form an oxygen gas barrier and the second layer, coated on the first layer, can form a water liquid and vapor barrier. In such instances, the first layer composition can include an acrylic latex dispersion and the second layer composition can include a polyvinyl alcohol. In other embodiments, the first and second layers can form gas barriers and barriers to light. In one aspect, the layers can be coated on the inside side of a substrate (i.e., the side intended for contact with the packaged liquid or food). If only one side of the substrate is to be coated, it is preferable that the inside side of the substrate be coated. In some instances, compositions are applied at a wet thickness to the substrate to provide a basis weight of about 100 g/m² or less. In other instances, the compositions are applied to provide dry basis weight of about 30 g/m² or less.

The substrate can also include a third layer composition comprising an aqueous polymeric solution or dispersion. In such instances, the first layer and the third layer can be same composition, or different compositions. In other embodiments, the substrate can include six or more layers, where the fourth, fifth, and sixth layers are placed on a side of the substrate exposed to a product contained in the packaging. In such aspects, the first and fourth layers can have the same composition. In other aspects, the substrate can include four layers of an aqueous polymeric solution or dispersion compositions. In such aspects, the third and fourth layers can be placed on a side of the substrate that is exposed to the atmosphere.

The substrate may be formed from any suitable material and, in some aspects, the substrate may be paper, paperboard, or any fibrous board base conventionally used in packaging. As such, the term "substrate" includes, without limitation, materials such as packaging films (including antiseptic, corrosion protective, vacuum and controlled atmosphere packages), paper, paperboard, carton, and other fibrous material bases used for packaging.

It is contemplated that the number and combination of coating layers applied to packaging material may be tailored to deliver desired performance packaging material attributes selected from one or more of oxygen transmission rate (OTR), water vapor transmission rate (WVTR), oil and grease resistance (©GR) and light. To this end, one or more of the coating layers may be the same or different. Also, it is contemplated that one or both sides of the substrate may be coated with one or more coating layers.

In an aspect, the food packaging material can include least two barrier providing layers, with the first layer forming a liquid and water vapor barrier. In such aspects, the composition can include an acrylic latex dispersion. In an aspect, the composition of the second layer forms an oxygen gas barrier, and can be made of a polyvinyl alcohol. In an embodiment, the liquid barrier layer can be between the outer layer and the substrate. In other embodiments, the oxygen barrier can between the substrate and the outer layer. In instances where the packaging material includes three layers, the second layer can be between the first and third layers, with the first layer adjacent the substrate and the third layer being the topmost layer. Alternatively, where the packaging material includes three layers, the first layer can be disposed on one side of the substrate, the second layer can be disposed on the second side of the substrate (opposite the first substrate) and the third layer may be disposed on the second layer. In an aspect, the first, second, and third layers are coated on the inside of the substrate. In an aspect, the third layer can comprise an acrylic latex dispersion.

In another aspect, the compositions of the first and second layers of the substrate of the food packaging product can vary. For example, in one embodiment, the first layer comprises a polyurethane latex dispersion and the composition of the second layer comprises an acrylic latex dispersion. In such an embodiment, the second layer can be the topmost layer, adjacent to the first layer opposite the substrate, and vice versa. Further, the first and second layers can be coated on the side of the substrate intended for the interior of the container. In another aspect, the composition of the first layer can include a mixture of polyvinyl acetate dispersion and a carbon-black dispersion and the composition of the second layer can include a polyolefin dispersion.

In other aspects, a packaging material includes a substrate and three coatings, with at least one coating applied to the substrate. Each coating includes an aqueous polymeric solution or dispersion dried to form a continuous film such that the packaging material exhibits tailored and desired performance attributes selected from one or more of oxygen transmission rate (OTR), water vapor transmission rate (WVTR) (also referred to as moisture vapor transmission rate (MVTR), oil and grease resistance (OGR) and light.

In some instances, it has been found that a suitable packaging material may consist essentially of or consist of a substrate and three coatings. In this aspect, one coating may provide desirable OTR performance attributes. The one coating may be disposed between at least two other coatings. Alternatively, the one coating may be disposed on a first side of the substrate with a second coating disposed on top of the one coating such that the one coating is sandwiched between the substrate and the second coating. The third coating is disposed an a second side of the substrate (opposite the first side).

In other embodiments, it has been found that a suitable packaging material may comprise, consist essentially of or consist of a substrate and three coatings. Each of the three coatings may be the same, different, or two may be the same and the third is different.

It is also contemplated that in connection with any of the described packaging materials, a print coating layer may be provided at a suitable location relative to other coating layers and may be suitable to impart digital (wet/dry toner) and conventional print properties. For example, a print coating layer may be provided on the substrate or may be provided as an outermost layer.

The compositions of the coating layers may also include additives. For example, any of the compositions of the coating layers can include additives. In such aspects, the additives can include fillers designed to enhance barrier characteristics, manufacturability, or other functions. For example, the fillers can include light absorbing fillers, odor control additives, light scattering particles (e.g., applied in a polymeric matrix), scavengers (oxygen, $CO_2$, ethylene, etc.), thickeners, surfactants, inorganics, antimicrobials, preservatives, friction control, anti-blocking, cross-linkers, nucleating agents, cellulose, microfibrillated cellulose, nanocellulose, and the like. In other aspects, the fillers may include inorganic fillers such as inorganic particulate filler that include talc, clays, silicon dioxide, diatamaceous earth, Kaolin, micas, gypsum, potassium nitrate, sodium chloride, metal chlorides, dolomite, bentonite, montmorillonite, metal sulfates, ammonium nitrate, sodium nitrate, titanium dioxides, sodium carbonate, calcium carbonate, magnesium carbonate, barium sulfate, magnesium sulfate, aluminum sulfate, magnesium oxide, calcium oxide, alumina, glass spheres, titanium dioxide, aluminum hydroxide, zeolites, and a combination thereof. In some aspects, the filler may be a bio-based filler that includes wheat straw, soy flakes, rice hulls, oat hulls, or a combination thereof.

In another aspect, methods of manufacturing the material packaging are described. In some instances, the method can include the steps of providing a substrate, providing a first and second coating composition, and forming a plurality of barrier layers on a first side of the substrate by forming a first barrier layer by coating and drying the first coating composition as a film onto the substrate, and forming a second barrier layer by coating and drying the second coating as a film on top of the first barrier layer. In one embodiment, the plurality of barrier layers can be coated simultaneously. In an aspect, the substrate can include a layer of paper or paperboard.

In another aspect, the first coating composition can include an acrylic latex dispersion. The second coating composition can include a polyvinyl alcohol. The method can also include forming a third barrier layer by coating and drying a third coating composition on top of the second barrier layer. In such aspects, the first and third compositions can be the same or different. In some aspects, the first and second barrier layers are formed to block oxygen and water vapor. In other aspect, the second layer can form a barrier to light.

Alternatively, the first and third coating compositions may provide both WVTR and OGR performance attributes and the second coating may provide OTR performance attributes. In this instance, the method may include forming a first layer on a first side of the substrate by coating and drying the first coating composition on the first side of the substrate. The method may also include forming a second layer on a second side of the substrate (opposite the first side) by coating and drying the second coating composition on the second side of the substrate and then forming a third layer by coating and drying the third coating composition on the second layer. This alternative method may comprise, consist essentially or, or consist of forming three layers.

The packaging material may be suitable for a variety of end uses such as, but not limited to, packaging for dry or wet foods, including flexible packaging for dry or wet foods.

This summary does not limit the scope of the claimed subject matter. Furthermore, the claimed subject matter is not constrained to the limitations that solve any or all disadvantages noted in any part of this disclosure. Features, aspects and advantages of the described packaging material may be understood with reference to the following description, appended claims and accompanying figures. Further, it is noted that all percentages are intended to be percentage by weight, unless specified otherwise.

BRIEF DESCRIPTION OF THE DRAWINGS

Further features and advantages of the packaging material may be ascertained from the following detailed description that is provided in connection with the drawing(s) described below.

DETAILED DESCRIPTION

Figure 1:
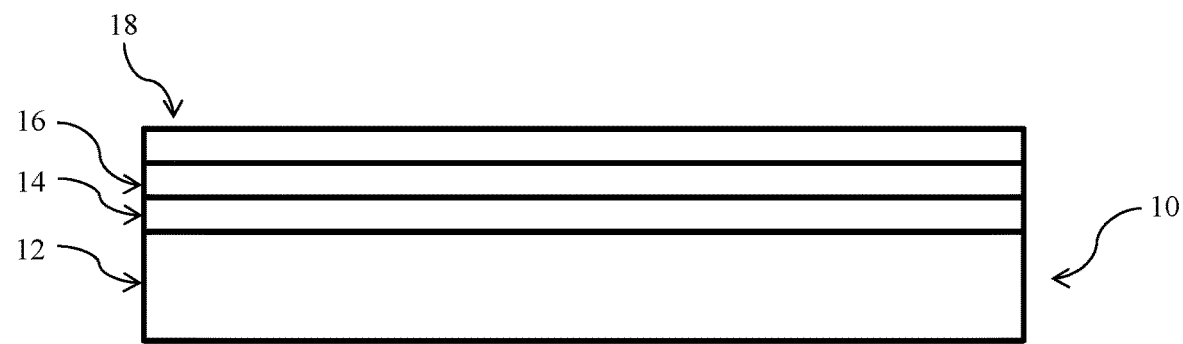
FIG. 1 is a cross-section of an embodiment of a packaging material that shows three coating layers on one side of the substrate.

A packaging material having a substrate and aqueous coating compositions and methods of making the packaging material are described. In an aspect, the packaging material has a substrate that includes at least two layers, wherein the at least two layers comprise a first layer and a second layer disposed on the first layer, wherein the first and second layers each comprise an aqueous coating composition. Some or all of the aqueous coating compositions include an aqueous polymeric solution or dispersion such that, when the composition is dried, a continuous film is formed to provide distinct barrier functions. In an aspect, the substrate can include treated or untreated paper and/or paperboard.

In other aspects, the packaging material has a substrate that includes at least three layers, wherein the at least two layers comprise a first layer and a second layer disposed on the first layer, wherein the first and second layers each comprise an aqueous coating composition. The third layer, which also comprises an aqueous coating composition, may be disposed on the second layer or may be disposed on a second side of the substrate. Some or all of the aqueous coating compositions include an aqueous polymeric solution or dispersion such that, when the composition is dried, a continuous film is formed to provide distinct barrier functions. In an aspect, the substrate can include treated or untreated paper and/or paperboard.

The described packaging material can be formed as a package including a flexible package, a stand-up pouch, or other configuration depending on the intended end use of the package formed from the packaging material. Suitable end uses include, but are not limited to, packaging for dry or wet foods that are stored and processed at a variety of temperatures including, but not limited to freezing, refrigeration temperatures, room temperature, and heated.

The packaging material may also find use as aseptic packaging, which typically refers to packaging in which a previously sterilized food is packed in a similarly previously sterilized package under aseptic conditions. An aseptic package is distinguishable from other types of liquid packaging in that the contents of the package may be stored in the package for up to 3, 4, 5, or 6 months and even longer at ambient temperature, without the contents deteriorating or being ruined.

It is also contemplated that the described packaging material may be used to package food that must, throughout its entire storage time in the package, be kept refrigerated (at most approx. 8° C.) in order not to deteriorate or be completely ruined. Additionally, the described packaging material may find use as retortable packages that are intended to be filled with food and, after sealing, be subjected to a heat treatment for the purposes of extending shelf-life at elevated temperature in an atmosphere of high relative humidity.

The described aqueous coating compositions may be applied to suitable substrates to achieve improved moisture resistance, water vapor barrier, oxygen barrier, oil and grease resistance and light shielding. In this regard, as will become clear later, the coating compositions may be tailored to achieve desired functional properties depending on the needs of the material being packaged.

The packaging materials of the present invention may include multiple barrier layers applied via aqueous coating onto an untreated or pre-treated substrate. For example, according to some aspects of the invention, a packaging material of the present invention may include a substrate and at least two aqueous coating barrier layers disposed thereon. In other aspects, a packaging material of the present invention may include a substrate and at least three aqueous coating barrier layers disposed thereon. In an aspect, such coatings are applied in-line on the same machine forming the paper base. The substrate, coating compositions, packaging, and methods of making are described in greater detail below.

Substrate

While the substrate could be formed from any suitable material, in some aspects, the substrate may be paper, paperboard, or any fibrous board base conventionally used in packaging. As such, the term "substrate" includes, without limitation, materials such as packaging films (including antiseptic, corrosion protective, vacuum and controlled atmosphere packages), paper, paperboard, carton, and other fibrous board bases used for packaging. The substrate may have a thickness of from about 40 µm up to about 600 µm, or from 40 µm to about 100 µm. In some instances, the substrate may have a thickness from about 100 µm to about 600 µm, or from about 100 µm to about 200 µm.

In some embodiments that may be useful in forming packaging materials, the substrate may have a caliper from about 0.1 points (pt.) to about 30 pt. In the case of gable top cartons, the substrate may have a caliper from about 14 pt. to about 22 pt. In other instances, which might find use as a flexible package, the substrate may have a caliper ranging from about 0.1 pt. to about 8 pt. In some instances where the substrate is a film, it may have a caliper from about 0.1 pt. to about 5 pt. or from about 0.2 pt. to about 4 pt. or from about 0.3 pt. to about 3 pt. or about 0.35 pt. to about 2 pt. In other instances where the substrate is paper, it may have a caliper from about 0.3 pt. to about 10 pt. or from about 0.5 pt. to about 8 pt. or about 0.7 pt. to about 6 pt. or about 0.8 pt. to about 5 pt. In some embodiments where the substrate is paperboard, the caliper may be about 2 pt. to about 20 pt. or about 3 pt. to about 15 pt. or about 5 pt. to about 10 pt. In other embodiments where the substrate is aseptic paper board, the caliper may be about 5 pt. to about 30 pt., or from about 10 pt. to about 25 pt. or about 12 pt. to about 20 pt.

The basis weight of the substrate may vary depending on factors such as the machine design and manufacturing conditions. However, in one embodiment, the basis weight of the substrate may be from about 40 g/m² to about 600 g/m² or from about 50 g/m² to about 500 g/m². In one embodiment, the basis weight of the substrate is about 200 g/m² to about 300 g/m². In another embodiment, the basis weight of the substrate is about 50 g/m² to about 150 g/m². For example, the basis weight of the substrate may be about 75 g/m² to about 125 g/m².

In some instances, the basis weight may range from about 10 to about 50 lbs/3000 ft², or from about 12 to about 30 lbs/3000 ft², or from about 12.5 to about 35 lbs/3000 ft², or from about 18 to about 22 lbs/3000 ft². In other instance, particularly where the substrate is aseptic paper board, the basis weight may range from about 75 lbs/3000 ft² to about 300 lbs/3000 ft², or from about 100 lbs/3000 ft² to about 250 lbs/3000 ft², or from about 120 lbs/3000 ft² to about 200 lbs/3000 ft².

The substrate may be untreated or pre-treated. However, as used in this description, when the substrate is pre-treated, the pre-treatment will be considered part of the substrate. A variety of pre-treatments may be used depending upon the identity and utility of the substrate. In one embodiment, a size press application may be applied in order to improve the holdout properties of the substrate. In another embodiment, a pigmented smoothing layer and/or other pre-coats can be applied in the substrate. In still another embodiment, when the substrate is a paperboard, it may be calendared to improve smoothness. In some instances, when the substrate is paper, the paper may be treated or coated with polymers to improve the water resistance or structural integrity of the substrate. Such polymers may include, but are not limited to polyethylene, polyhydroxyalkanoates (PHAs), polylactic acids (PLAs). The substrate can be treated and/or selected to have other characteristics, including, but not limited to, flexibility (resistance to score cracking), brightness, glazing, and anti-wicking properties. In yet another embodiment, an adhesion promoter may be applied to the substrate.

In some embodiments, the paper may be pretreated with a size press coating using sizing agents such as clay, calcium carbonate, styrene-acrylate binder, talc, alkenyl ketene dimer, alkenyl succinic anhydride, alkyl ketene dimer, styrene acrylic emulsion, styrene maleic anhydride, wax emulsions, and mixtures thereof.

In other embodiments, the paper may be a mixture of hardwood and softwood to reduce the pore volume. The mixture may have any suitable ratio of hardwood to softwood and in one instance the ratio may be about 1:1. In some instances, the substrate may be an aseptic board formed from a mixture of hardwood and softwood such that in some cases the aseptic board contains from about 35% to about 50% softwood with the balance being hardwood. In either instance, whether it is paper or aseptic board, each may include recycled fiber to replace some of either the softwood, the hardwood, or both.

The substrate, when untreated, may have a Parker Print Surf smoothness that ranges between about 0.5 and about 7 microns, or from about 1 to about 6 microns or from about 2 to about 5.5 microns, or from about 3 to about 5 microns as measured according to TAPPI T555 (ISO 8791/4). When treated, the substrate may have a Parker Print Surf smoothness that ranges between about 0.5 and about 2 microns, or about 0.6 to about 1.8 microns, or about 0.6 to about 1.7 microns, or about 0.7 to about 1.5 microns, or about 0.8 to about 1.3 microns, or about 0.9 to about 1.2 microns, as measured according to TAPPI T555 (ISO 8791/4).

For the purposes of the present invention, the term "substrate smoothness" refers to the extent to which the substrate surface deviates from a planar or substantially planar surface, as affected by the depth of the substrate, substrate width, numbers of departure from that planar surface, etc. As used herein, the substrate smoothness of a printable substrate may be measured by, for example, in terms of Parker Print Smoothness. Parker Print Smoothness may be measured by TAPPI test method T 555.

Alternatively, the surface roughness may be measured according to TAPPI test T-538 using a Sheffield smoothness apparatus to provide a Sheffield Roughness.

In some instances, the substrate exhibits a Sheffield Roughness in the range of about 40 ml/min to about 400 ml/min or about 60 ml/min to about 350 ml/min. In other embodiments, particularly where the substrate is paper having a smoother side (e.g. by being glazed or the like), the smoother side exhibits a Sheffield Roughness in the range of about 40 ml/min to about 200 ml/min or about 60 ml/min to about 180 ml/min, or about 80 nil/min to about 150 ml/min. In this instance, the rougher side may exhibit Sheffield Roughness in the range of about 140 ml/min to about 400 ml/min or about 160 ml/min to about 380 ml/min, or about 180 ml/min to about 350 ml/min.

One suitable paper may be 20 #ParaFree™ paper from Ahlstrom-Munksjo, which may be bleached or unbleached and may have a basis weight between about 18 to about 22 lbs/3000 ft$^2$. This paper is a machine glazed paper with one side being smoother (having a Sheffield Roughness of 80-110 ml/min) than the opposite side (having a Sheffield Roughness of 225-300 ml/min).

Aqueous Coating Compositions

The aqueous coating compositions may vary depending on the objective of the barrier layer(s) being formed and the placement of the particular barrier layer in the multi-barrier layer coating system.

The described aqueous coating compositions may be in the form of a continuous phase solution. That is, the barrier-forming polymeric components of the aqueous formulation are completely dissolved in the base solvent (e.g., water). In this aspect, the polymer resin is dissolved in an aqueous medium, for example, water. In another embodiment, the aqueous coating compositions described herein may be in the form of a dispersion. That is, the polymer resin is dispersed (for example, is present as small particles) in an aqueous medium such as water.

In one aspect, the aqueous coating compositions may include acrylic latex dispersions. Without being bound by any particular theory, it is believed that the use of acrylics in the aqueous coating composition of the invention may provide superior liquid and water vapor barrier properties. For instance, an aqueous coating layer including the use of one or more acrylic latex dispersions is resistant to aqueous liquids and provides a moisture vapor barrier. Additionally, the use of one or more acrylics in the aqueous coating composition of the invention provides superior heat sealing characteristics. Suitable examples of acrylic polymers useful in forming acrylic latex dispersions for use with the present invention include, but are not limited to, acrylic polymers, styrene-acrylic copolymers, styrene-acrylic acrylonitrile terpolymers, and derivatives thereof. Examples of commercially available acrylic latex dispersions for use with the present invention include JONCRYL® 74, 89, 537, 538, DFC 3030, and DFC 3040 from BASF Corporation, ACRONAL® dispersions from BASF Corporation, RHOPLEX™ dispersions from The Dow Chemical Company, and dispersions from Mallard Creek Polymers, Trinseo, Archroma, and Synthomer.

Where the aqueous coating compositions include acrylic latex emulsions, it is contemplated that the aqueous coating composition may also contain a cross-linking agent. Suitable cross-linking agents include, but are not limited to ammonium zirconium carbonate, glutaraldehyde, glyoxal, and metal oxides such as zinc oxide, calcium oxide, and magnesium oxide.

In another embodiment, the aqueous coating composition of the invention includes a polyvinyl alcohol (PVOH) solution, an ethyl vinyl alcohol (EVOH) solution, or combinations thereof. Without being bound by any particular theory, since PVOH and EVOH have high oxygen gas barrier properties, are relatively easy to use as a liquid film coating, and have high odor barrier properties, it is believed that the use of an aqueous coating including PVOH, EVOH, or a combination thereof in at least one coating layer will improve the overall barrier properties of the packaging material. Suitable EVOH and PVOH coating compositions may include one or more of cellulose, microfibrillated cellulose, nanocellulose, platy clays and the like. One example of a commercially available PVOH for use in this aspect of the invention includes SELVOL™ Polyvinyl Alcohol 21-205 Solution from Sekisui Specialty Chemicals America, LLC. An example of a commercially available EVOH for use in this aspect of the invention includes EXCEVAL™ RS-2117 from Kuraray.

In this aspect, the coating composition may include, along with the PVOH, EVOH, or combination thereof, a polymer or compound with functional carboxylic acid groups. Suitable examples of such a polymer with functional carboxylic acid groups include, but are not limited to ethylene acrylic acid copolymer (EAA), ethylene methacrylic acid copolymers (EMAA), or mixtures thereof. If included, this polymer may be present in an amount of about 1 percent to about 20 percent by weight of the dry coating, preferably about 5 percent to about 15 percent by weight of the dry coating. The coating composition may also include inorganic compounds such as metal oxides.

In yet another embodiment, the aqueous coating composition of the invention may include a polyurethane latex dispersion. As used herein, the term "polyurethane" refers to a polymer including multiple urethane (—NH—C(O)—O—) linkages within the backbone and, optionally, urea linkages (NH—C(O)—NH—) within the backbone. As used herein, a "polyurethane latex dispersion" refers to a polyurethane resin that, when neutralized, forms a stable dispersion in water or a water-miscible solvent. In this regard, the water-miscible solvent may be a single solvent or a blend of solvents, e.g., methanol, ethanol, propanol, and combinations thereof. The water-miscible solvent may also be a mixture of water and at least one water-miscible solvent.

Without being bound to any particular theory, the use of certain polyurethane latices in the aqueous coating composition of the invention confers an array of beneficial properties to the packaging material. For example, the polyurethane latex dispersion can provide good oxygen-barrier properties, high flexibility, and good adhesion with various substrates. In this aspect, the polyurethane latex dispersion may incorporate a neutralizable acid group or other anionic hydrophilic group that may be neutralized with a neutralizing agent. Suitable polyurethanes generally include the reaction product of at least one isocyanate-containing component, a polyisocyanate, and at least one isocyanate-reactive component, e.g., a hydroxy-terminated component or an amine-terminated component. Any isocyanate-containing component available to one of ordinary skill in the art is suitable for use according to the present invention including, but not limited to, 4,4'-diphenylmethane diisocyanate (MDI); polymeric MDI; carbodiimide-modified liquid MDI; 4,4'-dicyclohexylmethane diisocyanate (H12MDI); p-phenylene diisocyanate (PPM); m-phenylene diisocyanate (MPDI); toluene diisocyanate (TDI); 3,3'-dimethyl-4,4'-biphenylene diisocyanate (TODD; isophoronediisocyanate (IPDI); hexamethylene diisocyanate (HDI); naphthalene diisocyanate (NDI); xylene diisocyanate (XDI); p-tetramethylxylene diisocyanate (p-TMXDI); m-tetramethylxylene diisocyanate (m-TMXDI); ethylene diisocyanate; propylene-1, 2-diisocyanate; tetramethylene-1, 4-diisocyanate; cyclohexyl diisocyanate; 1,6-hexamethylene-diisocyanate (HDI); dodecane-1, 12-diisocyanate; cyclobutane-1,3-diisocyanate; cyclohexane-1, 3-diisocyanate; cyclohexane-I, 4-diisocyanate; 1-isocyanato-3,3,5-trimethyl-5-isocyanatomethylcyclohexane; methyl cyclohexylene diisocyanate; triisocyanate of HDI; triisocyanate of 2, 4, 4-trimethyl-1, 6-hexane diisocyanate (TMDI); tetracene diisocyanate; napthalene diisocyanate; anthracene diisocyanate; isocyanurate of toluene diisocyanate; uretdione of hexamethylene diisocyanate; and mixtures thereof.

Any hydroxy-terminated component available to one of ordinary skill in the art is suitable for use in forming the polyurethane latex dispersion including, but not limited to, polyether polyols, hydroxy-terminated polybutadiene (including partially/fully hydrogenated derivatives), polyester polyols, polycaprolactone polyols, and polycarbonate polyols. Any amine-terminated component available to one of ordinary skill in the art is suitable for use in forming the polyurethane latex dispersion including, but not limited to, 3,5-dimethylthio-2,4-toluenediamine and isomers thereof; 3, 5-diethyltoluene-2, 4-diamine and isomers thereof, such as 3,5-diethyltoluene-2, 6-diamine; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline); polytetramethyleneoxide-di-p-aminobenzoate; N,N'-dialkyldiamino diphenyl methane; r,r'-methylene dianiline; m-phenylenediamine; 4,4'-methylene-bis-(2-chloroaniline); 4,4'-methylene-bis-(2,6-diethylaniline); 4,4''-methylene-bis-(2,3-dichloroaniline); 4,4'-diamino-3,3'-diethyl-5,5'-dimethyl diphenylmethane; 2,2', 3,3'-tetrachloro diamino diphenylmethane; trimethylene glycol di-p-aminobenzoate; and mixtures thereof. The polyurethane latex dispersion may also include a curative that is an amine-terminated component or a hydroxy-terminated component. The polyurethane may be saturated or unsaturated.

The polyurethane latex dispersion may be formed according to any method known in the art including the one-shot technique or the prepolymer technique. In particular, in the one-shot technique, the isocyanate-containing component, isocyanate-reactive component, and curing agent are reacted in one step. The prepolymer technique involves a first reaction between an isocyanate-containing component and an isocyanate-reactive component to produce a prepolymer, and a subsequent reaction between the prepolymer and hydroxy and/or amine-terminated curing agent. In one embodiment, the polyurethane latex dispersion includes a prepolymer formed from the reaction product of an isocyanate and a polyol or a polyamine, which is then emulsified and reacted with an amine-terminated or hydroxy-terminated component. A particularly suitable commercially available polyurethane latex dispersion is TAKELAC™ WPB-341 from Mitsui Chemicals. Other examples of suitable commercially available polyurethane dispersions include, but are not limited to, BAYHYDROL® polyurethane dispersions from Covestro, SANCURE™ from Lubrizol, LEIPHEN®, EPOTAL®, and EMULDEIR® from the BASF Corporation, and polyurethane dispersions from Alberdingck Boley.

In still another embodiment, the aqueous coating composition may include a chlorinated polymer. For example, the aqueous coating composition may include a polyvinylidene chloride (PVDC) based latex. More specifically, the PVDC may be a homopolymer of PVDC and its copolymers and blends. Examples of copolymers suitable for use in this aspect of the invention include those with polyvinyl chloride (PVC) and chlorinated PVC (CPVC) and other copolymers containing any moiety derived from copolymerization with an active double bond such as an alkene, haloalkene or any of the acrylic containing monomers. Most commonly, in a latex dispersion, VDC is copolymerized with methyl methacrylate, methyl acrylate, butyl acrylate and/or acrylonitrile. One example of a commercially available family of PVDC copolymers for use with the present invention is DIOFAN®, e.g., DIOFAN® A063 from Solvay Specialty Polymers. Another example of a commercially available PVDC for use with the present invention is DARAN® PVDC dispersions available from Owensboro Specialty Polymers, Inc.

In yet another embodiment, the aqueous coating composition includes a polyolefin dispersion. The polyolefin dispersion may be made by polymerizing olefins such as ethylene, propylene, butene-1, pentene-1,4-methylpent-1-ene, and the like, in any conventional manner. In an aspect, using mechanical dispersion technology developed by Dow (commonly practiced under the BLUEWAVE™ mark), large polyolefin pellets are processed with a specially designed high-temperature polymer dispersant system. Water and neutralizer are added, resulting in a High Internal-Phase Emulsion (HIPE) that locks in the particle size needed for thin-film coatings. The emulsion is then diluted with water to create a stable suspension of polymer particles that are approximately 1 micron in diameter. These particles remain suspended in water until applied to a surface. Non-limiting examples of polyolefins suitable for use in this aspect of the invention include high-density polyethylene (HDPE), polypropylene, low-density polyethylene (LOPE), very low-density polyethylene (VLDPE), linear low-density polyethylene (LLDPE), polybutylene (PB), and blends thereof. Examples of commercially available polyolefin dispersions for use with the present invention include HYPOD™ polyolefin dispersions from The Dow Chemical Company or Aquaseal dispersions available from Paramelt.

It is contemplated that the aqueous coating compositions containing polyolefin dispersions may provide heat sealable layers. To this end, the heat sealable layers formed from polyolefin dispersions may include LDPE or LLDPE. In some instances the LOPE or LLDPE may have a number average molecular weight in the range from about 1000 to about 20,000.

In still another embodiment, the aqueous coating composition may include a polyester aqueous dispersion. The present invention contemplates the use of any aliphatic, semi-aromatic, or aromatic polyester. Non-limiting examples of polyesters suitable for use in this aspect of the invention include polyethylene terephthalate, polybutylene terephthalate, polytrimethylene terephthalate, polyethylene terephthalate, vectran, and their derivatives. Examples of commercially available polyester aqueous dispersions for use with the present invention include EvCote™ polyester aqueous dispersions from AkzoNobel and Eastek™ polyester aqueous dispersions from Eastman Chemical Company. The aqueous coating composition may also include aqueous dispersions of biodegradable polyesters. Biodegradable polyesters are advantageous in that such polyesters are biocompatible and have short degradation times. In one embodiment, the biodegradable polyester is an aliphatic polyester. Examples of aqueous dispersions of biodegradable polyesters for use with the aqueous coating systems of the present invention include, but are not limited to, polylactic acid, polyhydroxyalkanoate, polyglycolic acid, poly-e-caprolactone, polyhydroxybutyrate, and poly (3-hydroxy valerate).

In another embodiment, the aqueous coating composition may include styrene butadiene. Examples of commercially available styrene butadiene products include GenFlo from Omnova Solutions as well as products from BASF, Trinseo and Synthomer. In still another embodiment, the aqueous coating composition includes vinyl polymers or copolymers derived from moieties such as ethylene (for example, ethylene vinyl acetate), polystyrene, polyacrylonitrile, and polyvinyl acetate. One example of a commercially available polyvinyl acetate dispersion for use with the present invention is SUNBOND™ 3410 from Omnova Solutions.

The polymeric solutions and dispersions discussed above may be present in the aqueous coating composition in varying weight and volume percentages. The weight and volume percent of the polymeric solutions and dispersions will depend on the other components present in the composition. However, the volume percentage should be selected so that the barrier-providing polymeric solution or dispersion component forms a continuous and contiguous arrangement, in order to form an interconnected network. In addition, the volume percentage of the polymeric component should be selected so as to maintain the mechanical integrity of the substrate to be coated. In one embodiment, the polymeric component is present in the aqueous coating composition, on a dry volume basis, in an amount of about 35 volume percent to about 100 volume percent. In another embodiment, the polymeric component is present in the aqueous coating composition, on a dry volume basis, in an amount of about 50 volume percent to about 99 volume percent. In still another embodiment, the polymeric component is present in the aqueous coating composition, on a dry volume basis, in an amount of about 75 volume percent to about 95 volume percent.

In each of the coating compositions discussed above, the coating composition includes about 99 percent to about 60 percent of the dispersion, latex, or mixture by weight of the dry coating composition. In one embodiment, the coating composition includes about 99 percent to about 70 percent of the dispersion, latex, or mixture by weight of the dry coating composition.

In another embodiment, the coating composition includes about 99 percent to about 75 percent of the dispersion, latex, or mixture by weight of the dry coating composition. In still another embodiment, the coating composition includes about 95 percent to about 80 percent of the dispersion, latex, or mixture by weight of the dry coating composition. In other embodiments, the coating composition includes from about 1% to about 100%, or from about 45% to about 99% of the dispersion, latex or mixture by weight of the dry coating composition.

Additives

The compositions of the layers coated on the substrate can include additives. The additives may include thickeners, surfactants, inorganics, oxygen scavengers, scavengers for other gases such as carbon dioxide or ethylene, antimicrobials, preservatives, friction control, anti-blocking, colorants, dispersion stabilizers, and combinations thereof. The additives may also include freeze-thaw stabilizers, such as but not limited to, glycol ethers, alkylene glycols such as ethylene glycol and propylene glycol and combinations.

In such aspects, the additives can include fillers designed to enhance barrier characteristics, manufacturability, or other functions. For example, the fillers can include light absorbing fillers, odor control additives, light scattering particles (e.g., applied in a polymeric matrix), scavengers (oxygen, $CO_2$, ethylene, etc.), thickeners, surfactants, inorganics, antimicrobials, preservatives, friction control, anti-blocking, cross-liners, nucleating agents, cellulose, microfibrillated cellulose, nanocellulose, and the like. In other aspects, the fillers may include inorganic fillers such as inorganic particulate filler that include talc, clays, silicon dioxide, diatamaceous earth, Kaolin, micas, gypsum, potassium nitrate, sodium chloride, metal chlorides, dolomite, bentonite, montmorillonite, metal sulfates, ammonium nitrate, sodium nitrate, titanium dioxides, sodium carbonate, calcium carbonate, magnesium carbonate, barium sulfate, magnesium sulfate, aluminum sulfate, magnesium oxide, calcium oxide, alumina, glass spheres, titanium dioxide, aluminum hydroxide, zeolites, and a combination thereof. In some aspects, the filler may be a bio-based filler that includes wheat straw, soy flakes, rice hulls, oat hulls, or a combination thereof.

Inorganic additives are also contemplated for use in the aqueous coating compositions of the invention. Examples of inorganic additives suitable for use with the present invention include, but are not limited to, calcium carbonate, talc, clays, and nanoparticulates such as nanoparticulate clays. In one embodiment, the inorganic additive is a platy nanoparticulate, i.e., a particulate with a high aspect ratio and a low particle size. In this aspect, the aspect ratio of the inorganic additive may be greater than about 20 in its exfoliated form. In one embodiment, the aspect ratio of the inorganic additive ranges from about 50 to about 10,000.

In another embodiment, the aspect ratio of the inorganic additive ranges from about 50 to about 5,000. In yet another embodiment, the nanoparticulate preferably has a particle size in at least one dimension of less than about 100 nm. In one embodiment, the nanoparticulate has a particle size of about 50 nm or less. In another embodiment, the nanoparticulate has a particle size of about 20 nm or less. For example, the nanoparticulate may have a particle size of about 5 μm or less. Without being bound by any particular theory, it is believed that the use of such platy nanoparticulates improve the barrier properties by creating a more difficult path for gas molecules to traverse the barrier coating.

Suitable nanoparticulates include, but are not limited to, kaolin, kaolinite, antigorite, smectite, vermiculite, bentonite, illite, mica, laponite, dickite, nacrite, halloysite, antigorite, chrysotile, pyrophyllite, montmorillonite, hectorite, saponite, sauconite, sodium tetrasilicic mica, sodium taeniolite, margarite, vermiculite, phlogopite, xanthophyllite, atapulgite, zeolite, boehmite, diatomaceous and fuller's earth, calcined aluminium silicate, hydrated aluminium silicate, magnesium aluminium silicate, sodium silicate, magnesium silicate, and combinations thereof.

When included, the inorganic additive may be present in an amount of about 5 percent to about 40 percent by weight of the dry coating composition. In one embodiment, the inorganic additive is present in an amount of about 10 percent to about 40 percent by weight of the dry coating composition. The inorganic additive may also be present in the aqueous coating composition, on a dry volume basis, in an amount of about 2 volume percent to about 65 volume percent. In another embodiment, the inorganic additive may be present in the aqueous coating composition, on a dry volume basis, in an amount of about 10 volume percent to about 50 volume percent. In still another embodiment, the inorganic additive may be present in the aqueous coating composition, on a dry volume basis, in an amount of about 15 volume percent to about 40 volume percent.

When included, the dispersion stabilizer may be present in an amount of about 1 percent or less by weight of the dry coating composition.

The fillers may also include one or more light absorbing or scattering fillers. As used herein, the term "light absorbing filler" refers to an additive that is capable of absorbing light and providing opacity to the substrate after application of the aqueous coating composition, for example, the packaging material ultimately formed using the aqueous coating composition. Non-limiting examples of light absorbing fillers contemplated for use with the present invention include metal flakes, metal paste, metal nanoparticles, carbon black, dyes, pigmented colorants, titanium dioxide, and hollow sphere particles such as the commercially available ROPAQUE™ hollow sphere polymeric pigments from The Dow Chemical Company and Expancel Microspheres from AkzoNobel.

In one embodiment, the polymeric solutions and dispersions of the present invention may include aluminum flakes, paste, or nanoparticles as a light reflecting filler. For example, the aqueous coating composition may include a polyolefin dispersion and aluminum flakes or paste. One example of a commercially available aluminum paste for use with the present invention is STAPA IL HYDROLAN 801 55900/G from Eckart GmbH. The aluminum flakes may be present in the aqueous coating composition, on a dry weight basis, in an amount of about 10 percent to about 90 percent by weight of the coating composition. In another embodiment, the aluminum flakes may be present in the aqueous coating composition, on a dry weight basis, in an amount of about 12 percent to about 83 percent by weight of the coating composition. In still another embodiment, the aluminum flakes may be present in the aqueous coating composition, on a dry weight basis, in an amount of about 25 percent to about 75 percent by weight of the coating composition. In yet another embodiment, the aluminum flakes may be present in the aqueous coating composition, on a dry weight basis, in an amount of about 35 percent to about 65 percent by weight of the coating composition. The aluminum flakes may also be present in the aqueous coating composition, on a dry volume basis, in an amount of about 2 volume percent to about 65 volume percent. In another embodiment, the aluminum flakes may be present in the aqueous coating composition, on a dry volume basis, in an amount of about 10 volume percent to about 50 volume percent. In still another embodiment, the aluminum flakes may be present in the aqueous coating composition, on a dry volume basis, in an amount of about 15 volume percent to about 40 volume percent.

In another embodiment, any of the polymeric solutions and dispersions of the present invention may include carbon black, for example, a carbon black dispersion, as a light absorbing filler. For example, the aqueous coating composition may include a mixture of a polyvinyl acetate dispersion and a carbon-black dispersion. One example of a commercially available carbon black dispersion for use with the present invention is AQUABLAK® 8328 from Solution Dispersions. The carbon black may be present in the aqueous coating composition, on a dry weight basis, in an amount of about 5 percent to about 80 percent by weight of the coating composition. In another embodiment, the carbon black may be present in the aqueous coating composition, on a dry weight basis, in an amount of about 9 percent to about 77 percent by weight of the coating composition. In still another embodiment, the carbon black may be present in the aqueous coating composition, on a dry weight basis, in an amount of about 15 percent to about 65 percent by weight of the coating composition. In yet another embodiment, the carbon black may be present in the aqueous coating composition, on a dry weight basis, in an amount of about 20 percent to about 55 percent by weight of the coating composition. The carbon black may also be present in the aqueous coating composition, on a dry volume basis, in an amount of about 2 volume percent to about 65 volume percent. In another embodiment, the carbon black may be present in the aqueous coating composition, on a dry volume basis, in an amount of about 10 volume percent to about 50 volume percent. In still another embodiment, the carbon black may be present in the aqueous coating composition, on a dry volume basis, in an amount of about 15 volume percent to about 40 volume percent.

In other aspects, the additives may include compositions suitable to provide the packaging material with heat sealing properties. For example, one or more of the coating layers may include natural waxes, paraffin waxes, synthetic waxes, or a combination. Suitable waxes include polyethylene wax emulsions and paraffin/polyethylene wax emulsions sold by BASF Corporation as JONCRYL® Wax 28 and 120, respectively.

Biodegradability

In some aspects, it is desirable if the packaging material is biodegradable or compostable. The term "biodegradable" refers to a material that may be at least partially degraded when subjected to one or a combination of environmental conditions—including but not limited to temperature, sunlight, humidity, aerobic conditions, anaerobic conditions, microorganisms (e.g., bacteria, fungi, algae), and/or the like, and combinations thereof—for a fixed period of time, which yields at least one natural byproduct including but not limited to carbon dioxide, water, or a combination thereof. In some embodiments, a "biodegradable" material is converted into carbon dioxide and water in an amount that is greater than or equal to about 10 percent by weight, in some embodiments greater than or equal to about 20 percent by weight, in some embodiments greater than or equal to about 30 percent by weight, in some embodiments greater than or equal to about 40 percent by weight, in some embodiments greater than or equal to about 50 percent by weight, in some embodiments greater than or equal to about 60 percent by weight, in some embodiments greater than or equal to about 70 percent by weight, in some embodiments greater than or equal to about 80 percent by weight, in some embodiments greater than or equal to about 90 percent by weight, and in some embodiments greater than or equal to about 95 percent by weight.

The term "compostable" refers to a biodegradable material that may be broken down into only carbon dioxide, water, inorganic compounds, and/or biomass, which does not leave any visible or toxic residue. In some embodiments, it is desired to have the packaging material meet the ASTM D6868-11 Standard Specification for compostability of paper or paperboard, which requires any non-biodegradable organic constituent to be <1% of the dry weight of the finished product, and the total portion of organic constituents that are not biodegradable cannot exceed 5% of the total weight.

Formed Packaging Materials

The formed packaging materials may include multiple barrier layers formed from the described coating compositions. For example, in one embodiment, the packaging material may include at least two barrier layers formed from the aqueous coating compositions of the invention. In another embodiment, the packaging material may include at least three barrier layers formed from the aqueous coating compositions of the invention. The multiple barrier layers may be coated on a single side of the substrate or may be coated on both sides of the substrate. Various embodiments are described below.

In an aspect, the packaging material includes a substrate that has a first layer coated on a first side of the substrate, and a second layer coated on the first layer, placing the first layer between the substrate and the second layer. In an aspect, the second layer is oriented to be in contact with the contents that the packaging material is used to contain. In such aspects, the second layer can be configured to be a liquid and vapor barrier and the first layer is an oxygen gas barrier. In such instances, the barriers are placed closest to the most likely occurrence of exposure in which they are trying to block, protecting the adjacent layers to potential exposure to which they could be sensitive. For example, when the packaging material is used to contain a food item, which can include liquid and other vapors, the second layer, acting as a vapor and liquid barrier, can operate more efficiently to block the adjacent materials from crossing into the first layer. Likewise, the first layer, being adjacent the substrate and hence oxygen from exterior exposure, can prevent oxygen from entering or reaching the second layer and the food items.

Referring now to FIG. 1, one embodiment of the packaging material 10 is shown. The packaging material 10 includes a substrate 12 having two sides with barrier layers 14, 16, 18 provided on only one side of the substrate 12. In other aspects, the substrate 12 can be surrounded by three barrier layers on each side. As shown in FIG. 1, the packaging material 10 includes a first aqueous coating layer 14 formed from a first aqueous coating composition, a second aqueous coating layer 16 formed from a second aqueous coating composition, and a third aqueous coating layer 18 formed from a third aqueous coating composition. In this aspect, the third aqueous coating layer 18 is the topmost layer, i.e., the layer exposed to the atmosphere or to the packaged food. The second aqueous coating layer 16 is located between the third aqueous coating layer 18 and the first aqueous coating layer 14, and the first aqueous coating layer 14 is the bottommost layer, i.e., the layer disposed directly on the substrate 12. The first, second, and third aqueous coating compositions 14, 16, 18 respectively may be the same or different. For example, in one embodiment, the first aqueous coating composition 14 is the same as the third aqueous coating composition 18, but different from the second aqueous coating composition 16.

The packaging material 10 may include a first aqueous coating layer 14 formed from a coating composition including an acrylic latex dispersion, a second aqueous coating layer 16 formed from a coating composition including PVOH, EVOH, or a combination thereof, and a third aqueous coating layer 18 formed from a coating composition including the acrylic latex dispersion. In this aspect, as shown in FIG. 1, the third aqueous coating layer 18 is the topmost layer, i.e., the layer exposed to the atmosphere and/or the packaged food or liquid, and the first aqueous coating layer 14 is the bottommost layer, i.e., the layer disposed directly on the substrate 12. Without being bound to any particular theory, since PVOH, EVOH, or a combination thereof has good oxygen barrier properties but poor moisture vapor barrier properties and moisture resistance and acrylics have good liquid barrier and heat sealing properties, the second aqueous coating layer 16 resides between coating layers 14 and 18 that each include an acrylic latex dispersion. Indeed, the PVOH, EVOH, or combination thereof is encapsulated with a moisture-resistant coating (i.e., the acrylic latex dispersion) in order to minimize or mask the humidity-dependence of the internal PVOH/EVOH oxygen barrier performance. This three-layer coating configuration may also be applied to the inside of a substrate, i.e., the third aqueous coating layer 18 is exposed to the contents of the packaging rather than the atmosphere.

While the second coating layer described above is formed from a coating composition including PVOH, EVOH, or a combination thereof, it is also contemplated that the second coating layer composition may be the same as the first and third coating layer composition.

Figure 2:
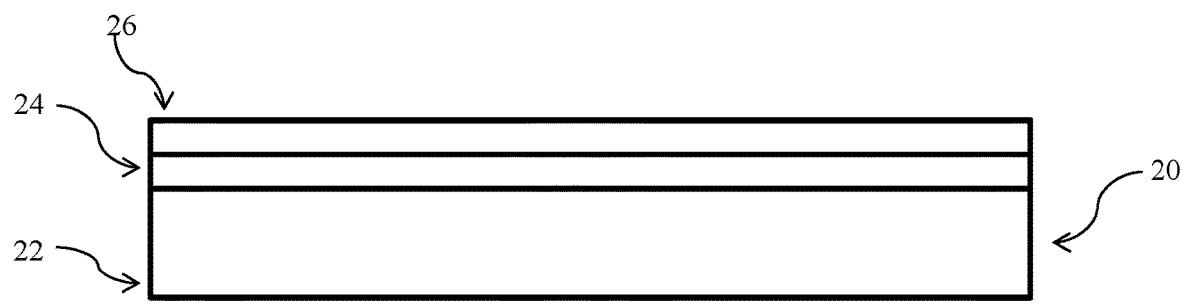
FIG. 2 is a cross-section of another embodiment of a packaging material that shows two coating layers on one side of the substrate.

In another embodiment, as shown in FIG. 2, the packaging material 20 includes a first aqueous coating layer 24 formed from a first aqueous coating composition and a second aqueous coating layer 26 formed from a second aqueous coating composition. In this aspect, the second aqueous coating layer 26 is the topmost layer, i.e., the layer exposed to the atmosphere or the packaged food or liquid, and the first aqueous coating layer 24 is the bottommost layer, i.e., the layer disposed directly on the substrate 22. The first and second aqueous coating compositions may be the same or different. For example, in one embodiment, the first aqueous coating composition is different from the second aqueous coating composition.

The packaging material 20 may include a first aqueous coating layer 24 formed from a coating composition including a polyurethane latex dispersion and a second aqueous coating layer 26 formed from a coating composition including an acrylic latex dispersion. In this aspect, as shown in FIG. 2, the second aqueous coating layer 26 is the topmost layer, i.e., the layer exposed to the atmosphere, and the first aqueous coating layer 24 is the bottommost layer, i.e., the layer disposed directly on the substrate 22. Without being bound to any particular theory, since water-based polyurethanes have high oxygen resistance but are often limited to non-direct-contact food packaging applications from a health and safety perspective, a second (top) layer formed from the acrylic dispersion is sufficient to achieve the desired overall oxygen barrier properties, liquid barrier, and heat sealing properties. This two-layer coating configuration may also be applied to the inside of a substrate, i.e., the second aqueous coating layer 26 is exposed to the contents of the packaging rather than the atmosphere.

In another embodiment, the packaging material 20 includes a first aqueous coating layer 24 formed from a coating composition including a polyvinylidene chloride-based latex and a second aqueous coating layer 26 formed from a coating composition including a polyolefin dispersion. Without being bound to any particular theory, since polyvinylidene chloride-based polymers have high oxygen and moisture vapor barrier properties and polyolefin dispersions have desirable liquid barrier and heat seal properties, this two-layer coating system may provide desired overall barrier properties. This two-layer coating configuration may also be applied to the inside of a substrate, i.e., the second aqueous coating layer 26 is exposed to the contents of the packaging rather than the atmosphere.

In still another embodiment, the packaging material 20 includes a first aqueous coating layer 24 formed from a coating composition including a mixture of a polyvinyl acetate dispersion and a carbon-black dispersion and a second aqueous coating layer 26 formed from a coating composition including a polyolefin dispersion. Without being bound to any particular theory, since polyvinyl acetate has desirable heat sealing and oxygen barrier properties, carbon-black provides light shielding properties, and polyolefin dispersions have desirable liquid barrier and heat sealing properties, this two-layer coating system may provide desired overall barrier and light shielding properties. This two-layer coating configuration may also be applied to the inside of a substrate, i.e., the second aqueous coating layer 26 is exposed to the contents of the packaging rather than the atmosphere.

In yet another embodiment, the packaging material 20 includes a first aqueous coating layer 24 formed from a coating composition including a polyvinylidene chloride-based latex and a second aqueous coating layer 26 formed from a coating composition including a polyolefin dispersion and aluminum flake. Without being bound to any particular theory, since polyvinylidene chloride-based polymers have high oxygen and moisture vapor barrier properties, polyolefin dispersions have desirable liquid barrier and heat sealing properties, and aluminum flake provides light shielding properties, this two-layer coating system will provide the desired overall barrier properties. This two-layer coating configuration may also be applied to the inside of a substrate, i.e., the second aqueous coating layer 26 is exposed to the contents of the packaging rather than the atmosphere.

Figure 3:
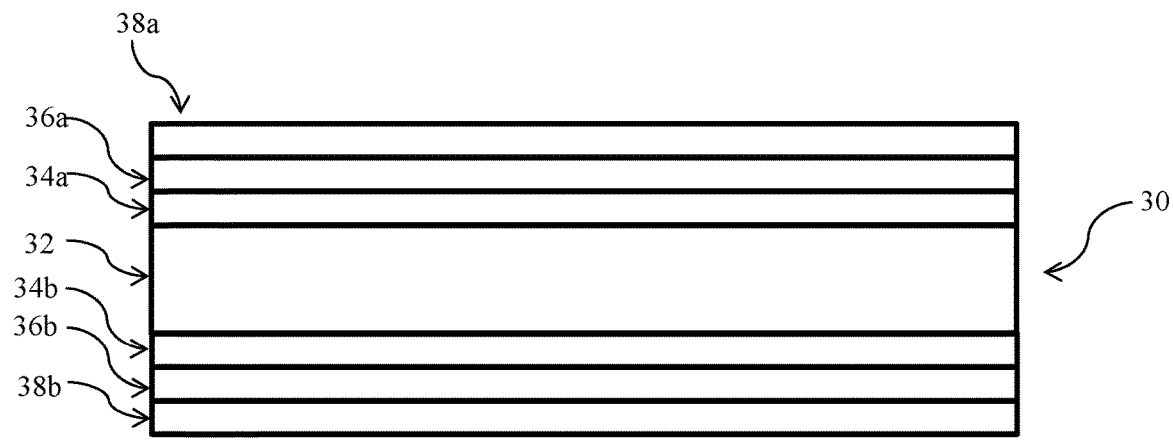
FIG. 3 is a cross-section of another embodiment of a packaging material that shows three coating layers on each side of the substrate.

In another embodiment, as shown in FIG. 3, the packaging material 30 includes a first aqueous coating layer 34a formed from a first aqueous coating composition, a second aqueous coating layer 36a formed from a second aqueous coating composition, and a third aqueous coating layer 38a formed from a third aqueous coating composition. In this aspect, the third aqueous coating layer 38a is the topmost layer, i.e., the layer exposed to the atmosphere, and the first aqueous coating layer 34a is the bottommost layer, i.e., the layer disposed directly on the substrate 32. The packaging material also includes a fourth aqueous coating layer 34b formed from a fourth aqueous coating composition, a fifth aqueous coating layer 36b formed from a fifth aqueous coating composition, and a sixth aqueous coating layer 38b formed from a sixth aqueous coating composition. In this aspect, the sixth aqueous coating layer 38b is the topmost layer, i.e., the layer exposed to the packaged product, and the fourth aqueous coating layer 34b is the bottommost layer, i.e., the layer disposed directly on the substrate 32.

The various coating layers may be formed of the same or different aqueous coating compositions. For example, in one embodiment, the first and third aqueous coating compositions are the same as the fourth and sixth aqueous coating compositions and the second and fifth aqueous coating compositions are the same. However, other configurations are contemplated. For example, while not shown, the substrate 32 may have only two aqueous coating layers on the inside of the packaging, i.e., the side of the substrate that contacts the packaged contents. The aqueous coating compositions layered on the inside of the substrate may differ from the aqueous coating compositions layered on the outside of the substrate. In the alternative, only one of the aqueous coating compositions layered on the inside of the substrate may differ from the aqueous coating compositions layered on the outside of the substrate.

In addition, it is contemplated that any combination of the first, second, fourth or fifth coating layer or all of them may include compositions suitable to provide oxygen permeation resistance such as by including EVOH, PVOH, or combinations.

Figure 4:
FIG. 4 is a cross-section of another embodiment of a packaging material that shows two coating layers on each side of the substrate.

FIG. 4 shows another embodiment of the packaging material. The packaging material 40 includes a first aqueous coating layer 44a formed from a first aqueous coating composition and a second aqueous coating layer 46a formed from a second aqueous coating composition. In this aspect, as shown in FIG. 4, the second aqueous coating layer 46a is the topmost layer, i.e., the layer exposed to the atmosphere, and the first aqueous coating layer 44a is the bottommost layer, i.e., the layer disposed directly on the substrate 42. The packaging material also includes a third aqueous coating layer 44b formed from a third aqueous coating composition and a fourth aqueous coating layer 46b formed from a fourth aqueous coating composition. In this aspect, as shown in FIG. 4, the fourth aqueous coating layer 46b is the topmost layer, i.e., the layer exposed to the packaged product, and the third aqueous coating layer 44b is the bottommost layer, i.e., the layer disposed directly on the substrate 42. The various coating layers may be formed of the same or different aqueous coating compositions. For example, in one embodiment, the first aqueous coating composition is the same as the third aqueous coating composition. In another embodiment, the fourth aqueous coating composition may be a different aqueous coating composition than any of the first, second, or third aqueous coating compositions.

In addition, it is contemplated that the first coating layer, the third coating layer or both of them may include compositions suitable to provide oxygen permeation resistance such as by including EVOH, PVOH, or combinations.

Figure 5:
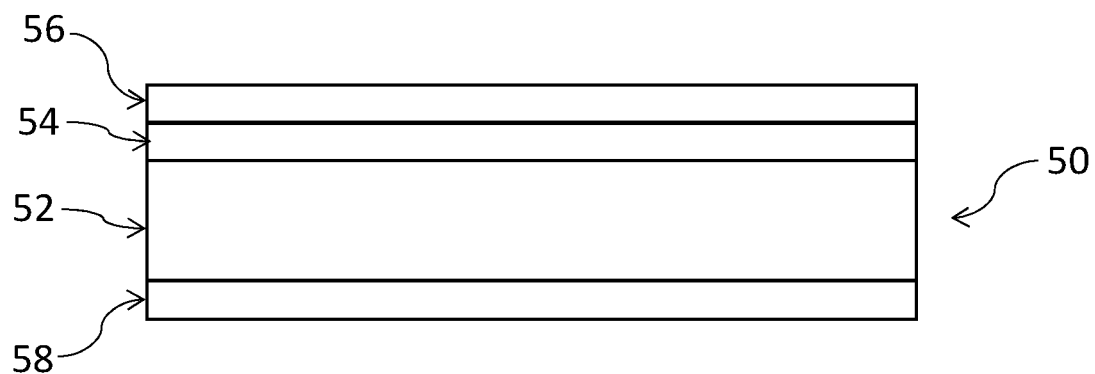
FIG. 5 is a cross-section of another embodiment of a packaging material that shows two coating layers on a first side of the substrate and one coating layer on the second side of the substrate.

FIG. 5 shows another embodiment of the packaging material. The packaging material 50 may include a substrate 52 on which a first aqueous coating layer 54 is applied to one side, a second aqueous coating layer 56 disposed on the first coating layer 54, and a third aqueous coating layer 58 applied to a second side of the substrate 52. The second layer 56 may be exposed to the atmosphere or to the packaged food. The first, second, and third aqueous coating compositions 54, 56, 58 respectively, may be the same or different. For example, in one embodiment, the first aqueous coating composition 54 is the same as the third aqueous coating composition 58, but different from the second aqueous coating composition 56. In this embodiment, the second aqueous coating composition 56 may provide oxygen permeation properties.

With regard to the embodiments depicted in FIGS. 3 and 5, it is contemplated that the packaging material may comprise, consist essentially of, or consist of three layers. In some instances, where the packaging material consists essentially of or consists of, it has been found that by providing one of the layers with oxygen permeation barrier characteristics (e.g., second layer 16 and 54) and the other two layers with water vapor transmission resistance and oil and grease resistance, a suitable packaging material can be provided.

Figure 6:
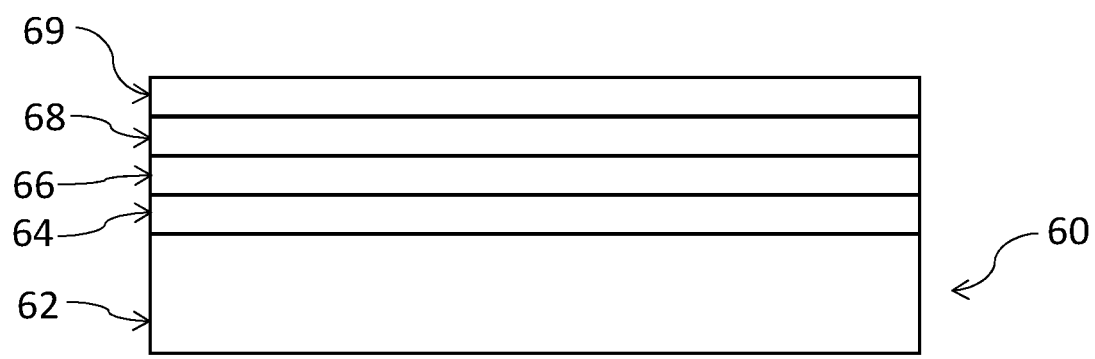
FIG. 6 is a cross-section of another embodiment of a packaging material that shows four coating layers on one side of the substrate.

FIG. 6 shows another embodiment of the packaging material. The packaging material 60 includes a substrate 62 on which successive first 64, second 66, third 68, and fourth layers 69 are applied to one side of the substrate. The first, second, third, and fourth aqueous coating compositions 64, 66, 68, and 69 respectively, may be the same or different. In one aspect, the second layer 66, the third layer 68, or both may include compositions to provided oxygen permeation barrier functions.

Figure 7:
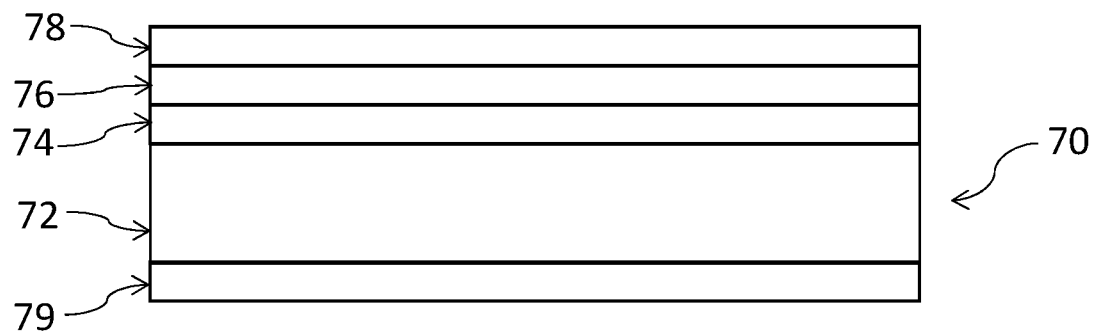
FIG. 7 is a cross-section of another embodiment of a packaging material that shows three coating layers on a first side of the substrate and one coating layer on the second side of the substrate.

FIG. 7 shows another embodiment of the packaging material. The packaging material 70 includes a substrate 72 having on a first side a first coating layer 74, a second coating layer 76, and a third coating layer 78. The substrate 72 also has on its second side a fourth coating layer 79. Either of the topmost layers, i.e., the third coating layer 78 or the fourth coating layer 79 may be exposed to the atmosphere or to the packaged food. The first, second, third, and fourth aqueous coating compositions 74, 76, 78, and 79 respectively, may be the same or different. In one aspect, the first layer 74, the second layer 76, or both may include compositions to provided oxygen permeation barrier functions.

Figure 8:
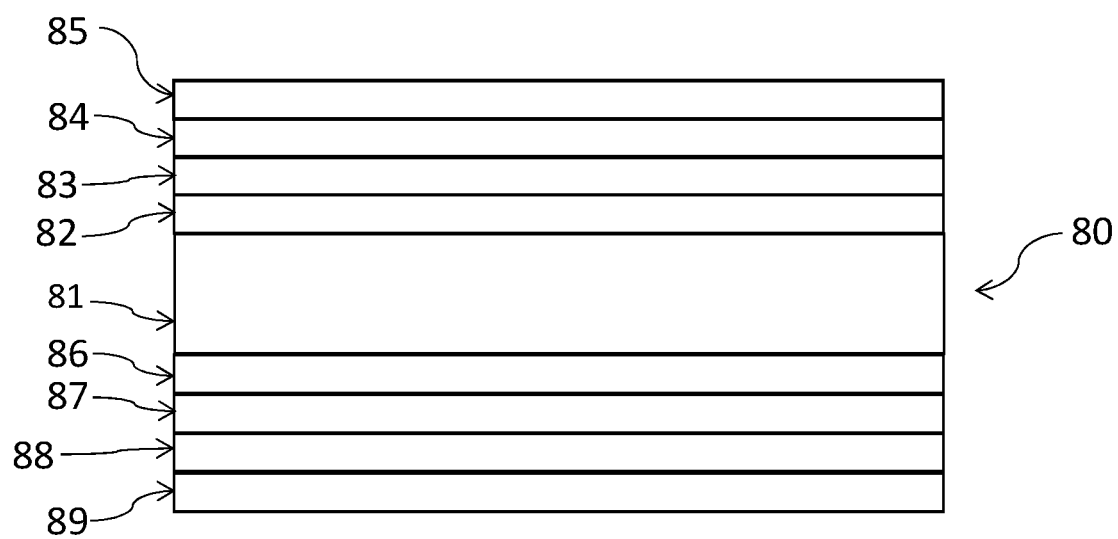
FIG. 8 is a cross-section of another embodiment of a packaging material that shows four coating layers on each side of the substrate.

FIG. 8 shows another embodiment of the packaging material. The packaging material 80 includes a substrate 81 having on a first side, a first coating layer 82, a second coating layer 83, a third coating layer, 84, and a fourth coating layer 85. The substrate 81 has on its second side (opposite the first side), a fifth coating layer 86, a sixth coating layer 87, a seventh coating layer 88, and an eighth coating layer 89. Either of the topmost layers, i.e., the fourth coating layer 85 or the eighth coating layer 89 may be exposed to the atmosphere or to the packaged food. Any of the coating compositions may be the same or different.

In some instances, where an oxygen permeation barrier function is provided, it is desirable that such a function is provided by one or more of the first 82, second 83, third 84, fourth 86, fifth 87, or sixth 88 coating layer.

Wet Thickness

The aqueous coating compositions may be applied to the untreated or pre-treated substrates at a wet thickness to provide a basis weight from about 1 $g/m^2$ to about 100 $g/m^2$ for each layer. In other words, the aqueous coating composition layer adjacent to or applied to one side of the substrate may be applied at a wet thickness to provide a basis weight from about 1 $g/m^2$ to about 100 $g/m^2$. Thereafter, each succeeding layer, if applied, is also applied at a wet thickness to provide a basis weight from about 1 $g/m^2$ to about 100 $g/m^2$. In some embodiments, each aqueous coating composition may be applied at a wet thickness to provide a basis weight from about 2 $g/m^2$ to about 50 $g/m^2$ or from about 5 $g/m^2$ to about 30 $g/m^2$ or from about 10 $g/m^2$ to about 25 $g/m^2$. In some embodiments, the aqueous coating compositions may be applied at a wet thickness to provide a basis weight of about 2 $g/m^2$ to about 25 $g/m^2$, or from about 10 $g/m^2$ to about 25 $g/m^2$, or about 14 $g/m^2$ to about 16 $g/m^2$. It is contemplated that each layer may have the same or different wet thickness depending on a variety of considerations such as manufacturing ease, barrier functional properties, and the like.

One of skill will appreciate that the wet thickness of any particular layer will impact one or more barrier properties and such can be adjusted to provide the desired moisture vapor transmission, oxygen permeation, oil and grease resistance, and light performance attribute. One of skill will also appreciate that the wet coating basis weight may depend, in part, on the type of coater being used. For example, one of skill will understand that a rod coater may require two layers to achieve the same performance as a single layer formed with a curtain coater.

Dry Thickness

The aqueous coating compositions may be applied to the untreated or pre-treated substrates to provide a dry basis weight from about 0.1 $g/m^2$ to about 30 $g/m^2$ or less for each layer. In other words, the aqueous coating composition layer adjacent to or applied to one side of the substrate may be applied to provide a dry basis weight from about 0.1 $g/m^2$ to about 30 $g/m^2$. In one embodiment, the aqueous coating compositions may be applied to the untreated or pre-treated substrates to provide a dry basis weight from about 0.2 $g/m^2$ to about 20 $g/m^2$ or from about 1 $g/m^2$ to about 20 $g/m^2$, or from about 1 $g/m^2$ to about 10 $g/m^2$ or from about 5 $g/m^2$ to about 15 $g/m^2$.

Coating Method

The aqueous coating compositions may be applied to the substrate using a variety of techniques, including but not limited to spraying, rod coating, roll coating, blade coating, slot die coating, gravure coating (direct, reverse, and offset), flexographic coating, size press (puddle and metered), slide hopper, and curtain-coating. In one embodiment, the barrier layers are formed by applying the aqueous coating compositions by rod coating. In another embodiment, the barrier layers are formed by applying the aqueous coating compositions with a technique that allows for simultaneous deposition of multiple layers. For example, the barrier layers may be formed by applying the aqueous coating compositions via curtain-coating or slide hopper coating. However, it is contemplated that not all barrier layers are applied to the substrate using the same technique, e.g., a first barrier layer may be applied via rod coating, a second barrier layer may be applied via curtain-coating, etc. Suitable application equipment and devices are described in G. A. Smoak, Handbook for Pulp and Paper Technologists (2nd Edition, 1992), pages 289-92, the entire contents and disclosure of which is incorporated herein by reference.

Moreover, one of skill will appreciate that the type of coating method may impact the wet coating thickness of any particular layer and that the type of coating method can be selected according to the desired thickness and/or properties desired from that particular layer. As noted above, it is contemplated that each coating layer may be provided by any desired coating method such that the desired performance attributes of the formed packaging material are achieved.

Properties

As noted above, the described packaging material can be formed into various configurations and can be used in a variety of applications. In some embodiments, the packaging material can be formed into flexible packages suitable for containing dry foods or wet foods, as described above. In other embodiments, the packaging material can be used for aseptic packaging and liquid packaging with improved total barrier properties for long-term storage as well improved recyclability.

In one embodiment, packages formed from the packaging material are able to preserve the qualities of the packaged contents, i.e., nutritional value, hygienic safety and taste, at ambient conditions for at least 3 months. In another embodiment, packages formed from the packaging material are able to preserve the qualities of the packaged contents, i.e., nutritional value, hygienic safety and taste, at ambient conditions for at least 4 months. In other instances, packages formed from the packaging material are able to preserve the contents for periods longer than 4 months. In addition, the coating systems of the invention may be tailored to be moisture-resistant and to provide oxygen barrier properties and heat sealing characteristics.

In one aspect, the coating compositions forming the coating layers and the relationship of the coating layers to each other and to the substrate can be varied to tailor, among other things, the oxygen transmission rate, the water vapor transmission rate, the oil and grease resistance, the peel strength, individually or collectively.

For example, the described packaging materials may provide an oxygen transmission rate (OTR) between about 1 $cc/m^2/day$ to about 30 $cc/m^2/day$ or about 2 $cc/m^2/day$ to about 25 $cc/m^2/day$, or about 3 $cc/m^2/day$ to about 20 cc/m²/day, or about 4 cc/m²/day to about 15 cc/m²/day, or about 5 cc/m²/day to about 10 cc/m²/day. The oxygen transmission rate may be measured in accordance with ASTM D3985.

The described packaging material may also provide a water vapor transmission rate (WVTR) between about 1 g/m²/day to about 75 g/m²/day, or from about 2, 3, 4, 5, 6, 7, 8, 9, or 10 g/m²/day to about 20, 25, 30, 35, 40, 45, 50, 55, 60, 65, or 70 g/m²/day. Water vapor transmission rate (WVTR) was measured via the wet cup technique with the coated layers (if present) oriented toward the liquid-filled water receptacle and placed in standard TAPPI conditions.

The described packaging material has desirable oil and grease resistance (OGR) properties. The oil and grease resistance (OGR) of the packaging material may be measured on the "barrier side" by the 3M kit test (TAPPI Standard T559 cm-02). With this rest, ratings are from 1 (the least resistance to oil and grease) to 12 (excellent resistance to oil and grease penetration). The described packaging material is coated to achieve 3M kit levels of at least 11 and in some instances achieve a level of 12.

Alternatively, the oil and grease resistance may be measured by pouring heated oil containing a red dye into the coated paperboard test article. The test article is removed after 20 minutes, and the percentage failure (the amount of staining) is calculated from the back side of the article using a standard grid. In some instances, the packaging material exhibits a percentage failure (an amount of staining) of less than about 20% or about 15% or about 14%, 13%, 12%, 11% or about 10%.

The described packaging material may, as noted above, be provided with coating layers that contain heat sealing components sufficient to provide a peel force according to ASTM method F88-09 in the range from about 500 g/in to about 2000 g/in, or from about 600 g/in to about 1800 g/in, or from about 800 g/in to about 1500 g/in.

Suitable Uses

As previously discussed, the described packaging material can be formed as a package including a flexible package, a stand-up pouch, or other configuration depending on the intended end use of the package formed from the packaging material. Suitable end uses include, but are not limited to, packaging for dry or wet foods. Dry foods may include snack foods like potato chips and other such chips made from sliced raw or cooked vegetables or fruit, generally similar or analogous dough-based ("fabricated") products such as corn "chips" and/or other such crisps, including multigrain "chips," curls, puffs, and other such products including tortilla chips (corn and flour), taco shells, granola bars, party mixes consisting of rice, wheat, corn, etc., and cereals (corn, wheat, and flour-based), croutons, crackers, bagels and bagel chips, pretzel-type products, doughnuts, cake-type products, nuts such as peanuts, walnuts, almonds, pecans etc. Dry foods may also include cookies, muffins, pastries, crackers, bread products including buns and rolls, biscuits, and numerous other such things. Dry foods may also include other types of foodstuffs such as dried or powdered foods, coffee (ground or whole beans), tea, etc. Wet foods, may include liquid beverages, milk, fruit juices, and the like intended for long term ambient storage, squeezable products such as yogurt, kefir, dressings, condiments and the like. Similarly, packaging of liquid food products intended for chilled storage and distribution are also contemplated. Likewise, packaging intended to be durable for sterilization of filled packages in autoclave of retort treatment such as for soups, pastes and semi-solid food are also contemplated.

The packaging material may also find use as aseptic packaging, which typically refers to packaging in which a previously sterilized food is packed in a similarly previously sterilized package under aseptic conditions. An aseptic package is distinguishable from other types of liquid packaging in that the contents of the package may be stored in the package for up to months and even longer at ambient temperature, without the contents deteriorating or being ruined.

It is also contemplated that the described packaging material may be used to package food that must, throughout its entire storage time in the package, be kept refrigerated (at most approx. 8° C.) in order not to deteriorate or be completely ruined. Additionally, the described packaging material may find use as retortable packages that are intended to be filled with food and, after sealing, be subjected to a heat treatment for the purposes of extending shelf-life at elevated temperature in an atmosphere of high relative humidity.

EXAMPLES

The following non-limiting examples are merely illustrative of the preferred embodiments of the present invention, and are not to be construed as limiting the invention, the scope of which is defined by the appended claims.

In each of the examples, various coating systems of the present invention were applied to a substrate, for example, paperboard. Table 1 below provides the wet and dry thicknesses of each of the coating layers applied in the examples.

TABLE 1

| Example or Comparative Example | Coating material | Meyer Rod | Approximate wet thickness, μ | Approximate dry thickness, μ |
| --- | --- | --- | --- | --- |
| 1, C, 2, E | ALD[1] | 15 | 34 | 16 |
| 1, B | PVA[2] | 25 | 57 | 12 |
| 2, D | PUL[3] | 15 | 34 | 10 |
| 3, 5 | DIOFAN ® B204 | 15 | 34 | 17 |
| 3, 5 | HYPOD ™9105 and 9105/Aluminum | 15 | 34 | 15 |
| 4 | SUNBOND ™ 3410/C-black | 12 | 27 | 14 |

[1]Joncryl ® 74-A from BASF Corporation - soft film forming rheology controlled Acrylic Latex Dispersion
[2]Selvol ® Polyvinyl Alcohol 21-205 Solution from Sekisui Specialty Chemicals America, LLC
[3]Takelac ® WPB-341 from Mitsui Chemicals America, Inc. - a non-chlorine water based polyurethane
DIOFAN ® B204 - polyvinylidene chloride
HYPOD ™9105 and 9105/Aluminum from The Dow Chemical Company - polyolefin dispersion
SUNBOND ™ 3410/C-black - polyvinyl acetate dispersion Example 1: Three Layer Coating System A solid bleached sulfate pre-coated with a composition including calcium carbonate and styrene-acrylate binder was used as the underlying substrate. The substrate was coated with an aqueous dispersion as shown in Table 2 below. Each coating layer was applied using a Meyer rod (which is also referred to as a Mayer rod) having the size designated in Table 2. After each coating, the layer was dried by forced air in a box oven at 200° F.

Moisture vapor transmission rate (MVTR) was measured via the wet cup technique with the coated layers (if present) oriented toward the liquid-filled water receptacle and placed in standard TAPPI conditions.

TABLE 2

|  | Example 1 | Comp. Ex. A | Comp. Ex. B | Comp. Ex. C |
|---|---|---|---|---|
| Bottom Layer | ALD[1] | — | PVA[2] | ALD[1] |
| Meyer Rod Size | 15 | 15 | 25 | 15 |
| Middle Layer | PVA[2] | — | — | ALD[1] |
| Meyer Rod Size | 25 | | | 15 |
| Top Layer | ALD[1] | — | | |
| Meyer Rod Size | 15 | | | |
| MVTR (g/m²/day) | 60 | 644 | 635 | 57 |

[1]Joncryl ® 74-A from BASF Corporation - soft film forming rheology controlled Acrylic Latex Dispersion
[2]Selvol ® Polyvinyl Alcohol 21-205 Solution from Sekisui Specialty Chemicals America, LLC As shown above, the composition and method of the present invention resulted in a MVTR an order of magnitude less than Comparative Examples A and B. In addition, when comparing the results of Example 1 and the results of Comparative Example C, it can be seen that a middle PVA layer, which is resistant to oxygen transmission, does not disrupt or change the MVTR.

Example 2: Two Layer Coating System

A solid bleached sulfate pre-coated with a composition including calcium carbonate and styrene-acrylate binder was again used as the underlying substrate. The substrate was coated with an aqueous dispersion as shown in Table 3 below. Each coating layer was applied using a Meyer rod having the size as designated in Table 3. After each coating, the layer was dried by forced air in a box oven at 200° F.

Moisture vapor transmission rate (MVTR) was measured via the wet cup technique with the coated layers (if present) oriented toward the liquid-filled water receptacle and placed in standard TAPPI conditions. Oxygen Transmission Rate (OTR) was measured in accordance with ASTM D3985.

TABLE 3

|  | Example 2 | Comp. Ex. D | Comp. Ex. E |
|---|---|---|---|
| Bottom Layer | PUL[1] | PUL[1] | ALD[2] |
| Meyer Rod Size | 15 | 15 | 15 |
| Top Layer | ALD[2] | — | — |
| Meyer Rod Size | 25 | | |
| MVTR (g/m²/day) | 99 | 180 | 95 |
| OTR (cc/m2/day) | 185 | 6400 | 8900 |

[1]Takelac ® WPB-341 from Mitsui Chemicals America, Inc. - a non-chlorine water based polyurethane
[2]Joncryl ® 74-A from BASF Corporation.

As shown above, the composition and method of the present invention resulted in a MVTR an order of magnitude less than Comparative Example D. In addition, when comparing the results of Example 2 and the results of Comparative Example E, it can be seen that an additional layer of PUL does not degrade the MVTR. Moreover, the two-layer system of Example 2 resulted in a large improvement in OTR.

Example 3: Two Layer Coating System with Heat-Sealable Layer Over Oxygen Barrier An uncoated paper substrate was used as the underlying substrate. A first layer of polyvinylidene chloride (Diofan® B 204 from Solvay Specialty Polymers USA, LLC) was applied to the substrate with the wet and dry thicknesses shown in Table 1 via a Meyer rod having a size of 15. The layer was then dried by forced air in a box oven at 200° F. A second layer including a polyolefin dispersion (Hypod® 9105 from Dow Chemical Company) was then applied over the first layer with a wet and dry thickness of shown in Table 1 via a Meyer rod having a size of 15 and dried in the same manner as the first layer. The resulting coated substrate was visually inspected and found to be defect-free and smooth.

Example 4: Two Layer Coating System with Heat-Sealable Layer Over Light-Blocking Layer A solid bleached sulfate pre-coated with a composition including calcium carbonate and styrene-acrylate binder was used as the underlying substrate. The substrate was then coated with a mixture of a polyvinyl acetate dispersion and a carbon-black dispersion as shown in Table 4 below. The mixture was applied at the wet and dry thicknesses shown in Table 1 using a Meyer rod having a size of 12. After coating, the light-blocking layer was dried by forced air in a box oven at 200° F. A polyolefin dispersion was then applied over the first layer at the wet and dry thicknesses shown in Table 1 using a Meyer rod having a size of 15 and dried in the same manner as the first layer.

TABLE 4

|  | Example 4 |
|---|---|
| Bottom Layer | |
| Polyvinyl Acetate Disperson[1] | 20 g |
| Carbon-Black Dispersion[2] | 4.5 g |
| Meyer Rod Size | 12 |
| To Layer | |
| Polyolefin dispersion[3] | |
| Meyer Rod Size | 15 |

[1]SUNBOND ™ 3410 from Omnova Solutions, Inc.
[2]Aquablak ® 8328 from Solutions Dispersions
[3]Hypod 9105 ™ from The Dow Chemical Company The resulting coated substrate was visually inspected and found to be defect-free and smooth.

Example 5: Two Layer Coating System with Light-Blocking Layer Over Oxygen/Moisture Vapor Layer A polyvinylidene chloride-based latex dispersion was applied to an uncoated paper substrate at the wet and dry thicknesses shown in Table 1 using a Meyer rod having a size of 15. After coating, the layer was dried by forced air in a box oven at 200° F. A mixture of a polyolefin dispersion and aluminum flake (as shown in Table 5 below) was then applied over the first layer at the wet and dry thicknesses shown in Table 1 using a Meyer rod having a size of 15 and dried in the same manner as the first layer.

TABLE 5

|  | Example 4 |
|---|---|
| Bottom Layer | |
| Polyvinyl Chloride-based Disperson[1] | |
| Meyer Rod Size | 15 |
| Top Layer | |
| Polyolefin Dispersion[2] | 20 g |
| Aluminum Flake[3] | 1.7 g |

[1]Diofan ® B 204 from Solvay Specialty Polymers USA, LLC.
[2]Hypod 9105 ™ from The Dow Chemical Company.
[3]STAPA IL HYDROLAN 801 5590/G Aluminum Paste from Eckart GmbH.

The resulting coated substrate was visually inspected and found to be defect-free with a metallic appearance (like a foil), smooth, and having improved opacity as compared with the uncoated paper substrate.

Example 6

Various coating compositions were prepared as shown in Table 6 and included the noted raw materials within the described ranges such that the total amount of the components equaled 100% by weight.

TABLE 6

| Material | Composition 6-1 | Composition 6-2 | Composition 6-3 | Composition 6-4 |
|---|---|---|---|---|
| Water | 6-9% | 6-9% | 6-10% | 5-9% |
| Low Tg acrylic resin[1] | 35-39% | 35-39% | — | — |
| Ambient Tg acrylic resin[2] | 32-36% | 32-36% | — | — |
| PVDC emulsion[3] | — | — | 75-85% | 65-80% |
| Paraffin/PE wax[4] | 8-12% | — | — | — |
| PE wax[5] | — | 8-12% | — | 6-10% |
| Propylene Glycol | 7-11% | 7-11% | 5-15% | 11-15% |
| Crosslinker (zinc Oxide #1) | 1-3% | 1-3% | — | — |

[1]Joncryl DFC 3030 from BASF Corporation
[2]Joncryl DFC 3040 from BASF Corporation
[3]Diofan A063 from Solvay Specialty Polymers
[4]Joncryl Wax 120 from BASF Corporation
[5]Joncryl Wax 28 from BASF Corporation Example 7

A paper substrate was coated on a first side and a second side with a first coating layer using composition 6-4 with a #6 Meyer rod at a wet coating weight of 15.4 g/m². Thereafter, a second coating layer was applied to each of the first coating layers using composition 6-4 with a #6 Meyer rod at a wet coating weight of 15.4 g/m².

Example 8

A paper substrate was coated on a first side with a first and a second coating layer, with each of the first and second coating layers containing the composition 6-1 and were applied with a #6 Meyer rod at a wet coating weight of 15.4 g/m². Thereafter, a third, fourth, and fifth coating layer were applied on the second layer and each of the third, fourth, and fifth coating layers contained EVOH and were applied with a #6 Meyer rod at a wet coating weight of 15.4 g/m². Thereafter, a sixth and seventh coating layer were applied to the fifth coating layer and each of the sixth and seventh coating layers contained the composition 6-1 and were applied with a #6 Meyer rod at a wet coating weight of 15.4 g/m².

Example 9

A paper substrate may be coated on a first side with a first, a second, and a third coating layer, with each of the first, second, and third coating layers containing EVOH that may be applied with a #6 Meyer rod at a wet coating weight of 15.4 g/m². Thereafter, a fourth and fifth coating layer may be applied to the third coating layer, with each of the fourth and fifth coating layers containing the composition 6-1, which may be applied with a #6 Meyer rod at a wet coating weight of 15.4 g/m². In addition, a sixth and seventh coating layer may be applied to a second side of the paper substrate. The sixth and seventh coating layers may contain the composition 6-1, which may be applied with a #6 Meyer rod at a wet coating weight of 15.4 g/m².

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used. The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims. All patents and patent applications cited in the foregoing text are expressly incorporated herein by reference in their entirety.

The invention claimed is:

1. A packaging material consisting essentially of a substrate and three aqueous coating layers, with the substrate having a first side and a second side, wherein one of the first and second side exhibits a Sheffield Roughness in a range between about 40 ml/min to about 400 ml/min;
   the three aqueous coating layers including
   a. a first coating applied to one of the first or second side of the substrate to form a first coating layer, the first coating comprising an amount of an acrylic latex dispersion to provide water vapor barrier properties and oil and grease resistance, a second coating applied to the first coating layer to form a second coating layer and comprising an amount of a polyvinyl alcohol, ethyl vinyl alcohol, or combinations thereof to provide oxygen barrier properties, and a third coating layer applied to the second coating layer and comprising a latex dispersion, or
   b. a first coating applied to the first side of the substrate to form a first coating layer, the first coating comprising an amount of a polyvinyl alcohol, ethyl vinyl alcohol, or combinations thereof to provide oxygen barrier properties, a second coating applied to the first coating layer to form a second coating layer and comprising an amount of an acrylic latex dispersion to provide water vapor barrier properties and oil and grease resistance, and a third coating applied to the second side of the substrate, the third coating comprising an amount of an acrylic latex dispersion to provide water vapor barrier properties and oil and grease resistance;

wherein the packaging material is biodegradable or compostable, has an oxygen transmission rate (OTR) between about 1 $cc/m^2/day$ to about 30 $cc/m^2/day$, a water vapor transmission rate (WVTR) between about 1 $g/m^2/day$ to about 75 $g/m^2/day$, and an oil and grease resistance to provide less than about 10% staining.

2. The packaging material of claim 1 wherein the substrate comprises paper having a basis weight between about 10 lbs./3000 $ft^2$ and about 50 lbs./3000 $ft^2$.

3. The packaging material of claim 2 wherein the paper has been pretreated with a size press coating using a sizing agent selected from the group consisting of alkenyl ketene dimer, alkenyl succinic anhydride, alkyl ketene dimer, styrene acrylic emulsion, styrene maleic anhydride, wax emulsions, and mixtures thereof.

4. The packaging material of claim 2 wherein the paper has been pretreated with size press coating containing talc filler.

5. The packaging material of claim 1 wherein each coating layer is applied in an amount to provide a total coating basis weight from about 5 $g/m^2$ to about 50 $g/m^2$.

6. The packaging material of claim 1 wherein at least the third coating layer is an aqueous emulsion that includes one or more acrylic polymers and one or more heat sealable waxes.

* * * * *